Patented Nov. 5, 1929

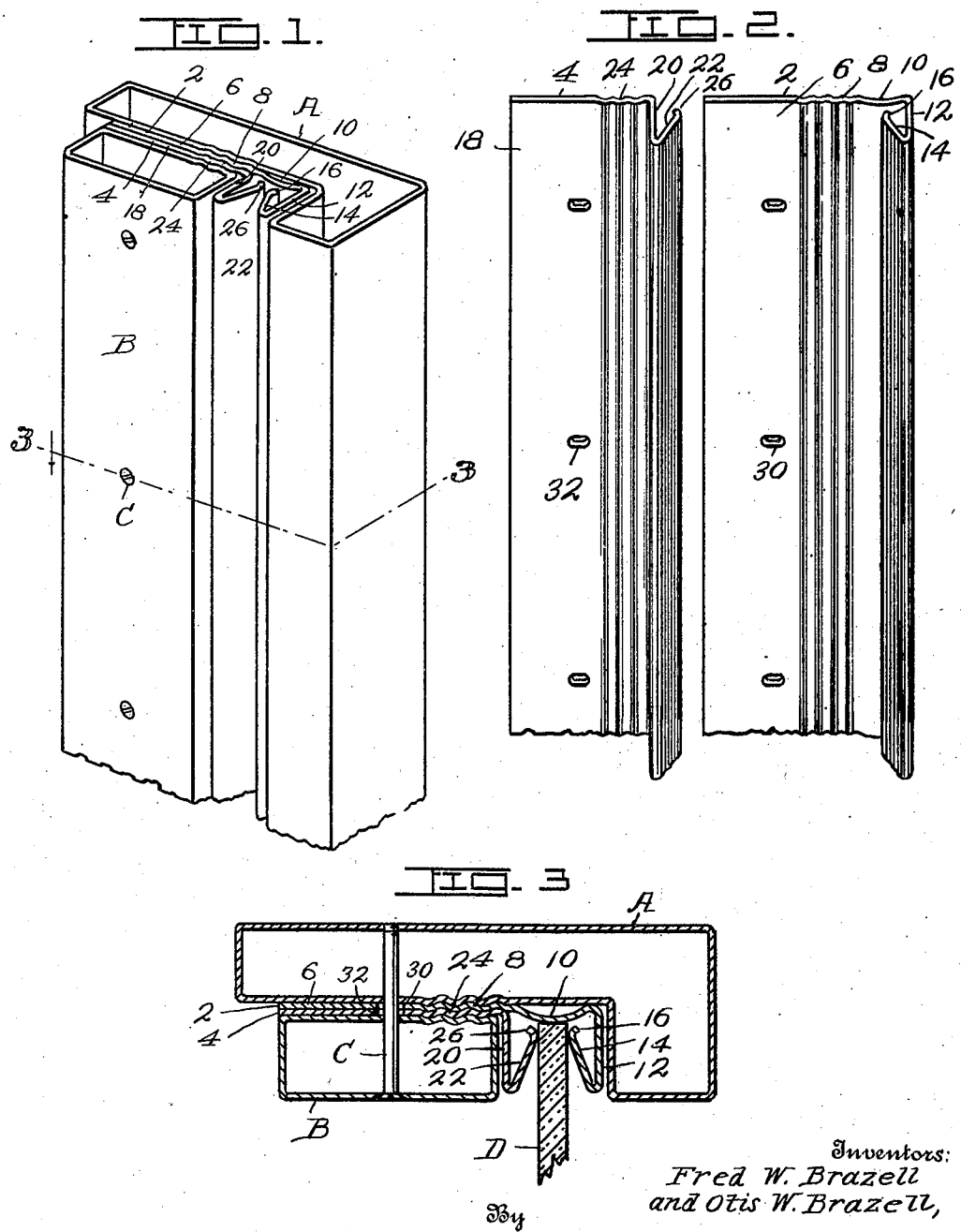

1,734,711

UNITED STATES PATENT OFFICE

FRED W. BRAZELL AND OTIS W. BRAZELL, OF ST. JOSEPH, MISSOURI

METALLIC WEATHER STRIP

Application filed August 15, 1927. Serial No. 213,136.

Our invention relates to improvements in that class of metallic weather strips wherein a weather-proof sealing joint is provided between a door and its frame or a sash and its frame to permit of easy operation of the door or sash and to exclude the elements as rain, dust, snow and wind.

A further object is to provide weather strip of this character which is especially suitable for application to the windows of motor vehicles for the purpose of forming a weatherproof joint between the windows and the frame and which will prevent rattling or vibration of such windows.

In order that the invention may be fully understood, reference will now be had to the accompanying drawing, in which:

Fig. 1 is a broken perspective view of a portion of a frame equipped with our weather strip.

Fig. 2 is a perspective view of the two members of the strip dissembled.

Fig. 3 is a cross section on line 3—3 of Fig. 1, with a portion of a glass added.

Referring in detail to the different parts, A designates a frame of any suitable type provided with a molding B which is removably held in place by means of screws C.

Referring more particularly to the weather strip constituting the invention, 2 designates one member of said strip and 4 designates the companion member. The strips 2 and 4 consist preferably of noncorrosive and resilient sheet metal of any suitable gage.

The member 2 consists of a longitudinal base 6 which is provided with a suitable number of longitudinal corrugations 8. The base 6 is bowed forwardly as indicated at 10 and one side of the bowed portion is bent forwardly at an angle to constitute a longitudinal rib 12. The forward portion of the rib 12 is folded backwardly at an acute angle to form a longitudinal wing 14, the inner margin 16 of which is curved slightly towards the rib 12.

The member 4 of the weather strip, like the member 2, consists of one piece of sheet metal and comprises a longitudinal base 18, a longitudinal rib 20 projecting forwardly from said base 18, and a longitudinal wing 22 extending backwardly at an obtuse angle from the forward portion of said rib 20. The base 4 has a longitudinally corrugated portion 24 to fit the corrugated portion 6 of the base 8, and the margin 26 of the wing 22 is curved slightly towards the rib 20.

In practice the members 2 and 4 are applied to the frame A, to which they are secured by the molding B and the screws C, which latter pass through holes 30 and 32 in the bases 2 and 4, respectively. Before the screws C are tightened the members 2 and 4 are adjusted towards each other to cause the wings 14 and 22 to exert pressure upon opposite sides of the window glass D for the purpose of excluding the elements and preventing said glass from rattling. The forwardly bowed portion 10 which contacts the vertical edge of the glass, coacts with the wings 14 and 22 in preventing rattling and vibration of the glass D and forming a runway in which said glass D may be raised or lowered.

By forming the weather strip of two members as stated, said members may be adjusted to carry the wings 14 and 22 towards or away from each other for the purpose of accommodating glass of different thicknesses, and by corrugating the base members 2 and 4 one cannot slip upon the other after the screws C have been tightened, but will be firmly held in their adjusted positions.

From the foregoing description it is apparent that we have provided a weather strip embodying the advantages above pointed out, and while we have shown and described the preferred construction, combination and arrangement of parts, we reserve all rights to such changes and modifications as properly fall within the spirit and scope of the invention as claimed.

Having thus described our invention, what we claim and desire to secure by Letters Patent, is:

In combination, a member consisting of a longitudinal rib, a longitudinal wing extending backwardly at an acute angle from said rib, and a corrugated base extending laterally from the rear portion of the rib and away from the inner margin of said wing, a second member consisting of a corrugated base adapted to fit against the back of the first-mentioned base, a longitudinal rib projecting forwardly from the base on said second member, and a wing extending backwardly at an acute angle from the last-mentioned rib, a frame having a corrugated surface against which the corrugated base of the second member is adapted to fit, a molding having a corrugated surface adapted to fit against the corrugated surface of the first-mentioned base, and means for securing the aforementioned corrugated portions together.

In testimony whereof we affix our signatures.

FRED W. BRAZELL.
OTIS W. BRAZELL.